United States Patent
Copeland

(10) Patent No.: US 11,965,618 B1
(45) Date of Patent: Apr. 23, 2024

(54) PIPE JOINT GASKET AND METHOD OF USING SAME

(71) Applicant: McWane, Inc., Birmingham, AL (US)

(72) Inventor: Daniel A. Copeland, Bessemer, AL (US)

(73) Assignee: HULTEC ACQUISITION, LLC, Fort Worth, TX (US)

( * ) Notice: Subject to any disclaimer, the term of this patent is extended or adjusted under 35 U.S.C. 154(b) by 256 days.

(21) Appl. No.: 17/495,234

(22) Filed: Oct. 6, 2021

Related U.S. Application Data

(63) Continuation of application No. 29/801,158, filed on Jul. 27, 2021, and a continuation of application No. 29/801,157, filed on Jul. 27, 2021.

(51) Int. Cl.
| | |
|---|---|
| *F16L 47/10* | (2006.01) |
| *F16L 21/00* | (2006.01) |
| *F16L 21/03* | (2006.01) |
| *F16L 37/084* | (2006.01) |
| *F16L 37/092* | (2006.01) |
| *F16L 47/12* | (2006.01) |
| *F16L 47/06* | (2006.01) |

(52) U.S. Cl.
CPC ............ *F16L 47/10* (2013.01); *F16L 21/007* (2013.01); *F16L 21/03* (2013.01); *F16L 37/0845* (2013.01); *F16L 37/0925* (2013.01); *F16L 47/12* (2013.01); *F16L 47/065* (2013.01)

(58) Field of Classification Search
CPC ....... F16L 47/065; F16L 47/12; F16L 21/007; F16L 21/03; F16L 37/0845; F16L 37/0925; F16L 47/10
See application file for complete search history.

(56) References Cited

U.S. PATENT DOCUMENTS

| | | | |
|---|---|---|---|
| 1,447,816 | A | 3/1923 | Peelle |
| 2,117,807 | A | 5/1938 | Jesser |
| 3,377,075 | A | 4/1968 | Feller |
| 5,295,697 | A | 3/1994 | Weber et al. |
| 5,360,218 | A | 11/1994 | Percebois et al. |
| 5,464,228 | A | 11/1995 | Weber et al. |
| D514,671 | S | 2/2006 | Jones |
| 7,537,248 | B2 * | 5/2009 | Jones ............... F16L 47/12 285/379 |

(Continued)

*Primary Examiner* — James M Hewitt, II
(74) *Attorney, Agent, or Firm* — Whitaker Chalk Swindle & Schwartz, PLLC; Charles D. Gunter, Jr.

(57) ABSTRACT

A method for inhibiting separation of joined pipes including providing within a pipe bell a gasket including rigid segments, each segment having bell teeth configured for engaging the bell and a spigot tooth configured for engaging a pipe spigot seated in the bell. Upon pressurization and over-pressurization of the joint, resulting axial forces exerted on the joint, which can cause pipes to separate, are countered by wedging the segments between the bell and the spigot and rotating each segment so that the thrust forces are directed radially. To prevent radially-directed thrust forces from damaging the joint through over-rotation of the segments, the bell teeth and the spigot tooth are adapted and arranged to maintain the thrust forces load path carried by each segment within a desired angular range relative to the spigot by transferring the load path between adjacent bell teeth whereby the effective length of each segment is increased.

17 Claims, 13 Drawing Sheets

(56) References Cited

U.S. PATENT DOCUMENTS

| | | |
|---|---|---|
| 8,857,861 B2 | 10/2014 | German et al. |
| D834,690 S | 11/2018 | Copeland et al. |
| D840,515 S | 2/2019 | Copeland et al. |
| D846,095 S | 4/2019 | Copeland et al. |
| D852,935 S | 7/2019 | Copeland |
| D857,859 S | 8/2019 | Copeland et al. |
| 2003/0107214 A1 | 6/2003 | Holmes, IV et al. |
| 2005/0218605 A1* | 10/2005 | Walworth ........... F16L 37/0845 277/609 |
| 2015/0152990 A1* | 6/2015 | Lopez-Chaves .... F16L 37/0845 277/609 |
| 2017/0328503 A1* | 11/2017 | Copeland .............. F16L 17/035 |

* cited by examiner

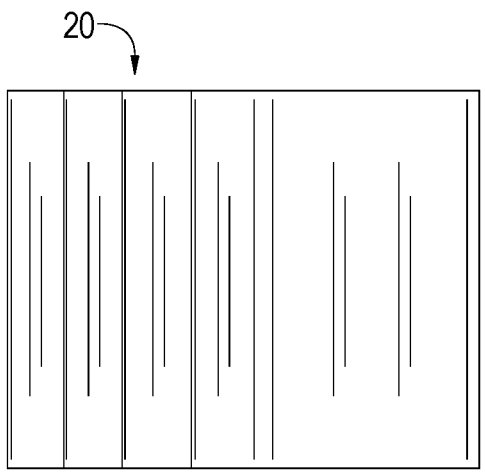
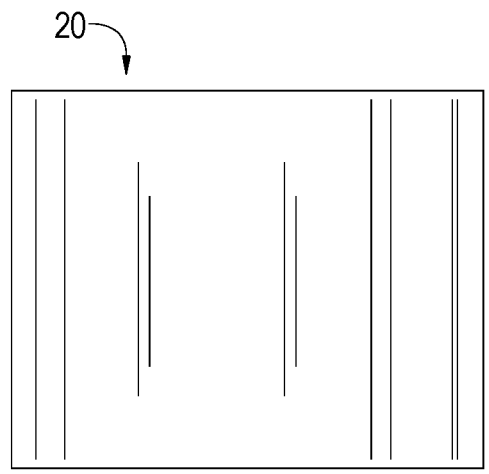
FIG. 14  FIG. 15
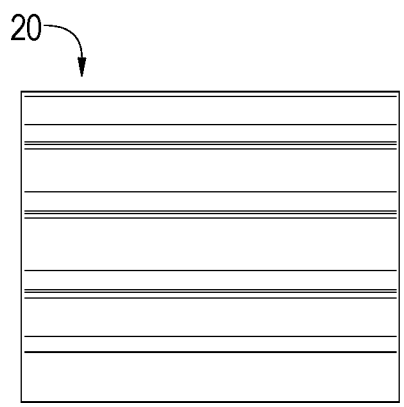
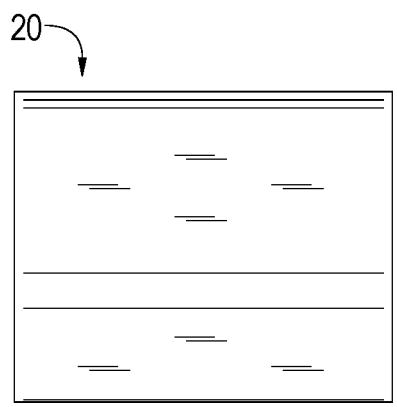
FIG. 16  FIG. 17
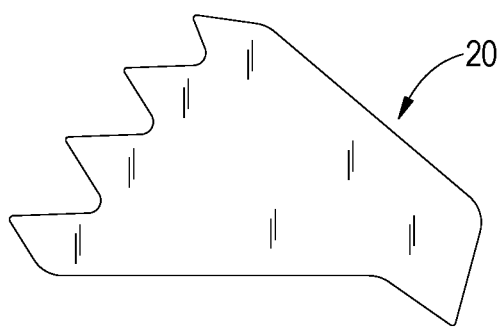
FIG. 18

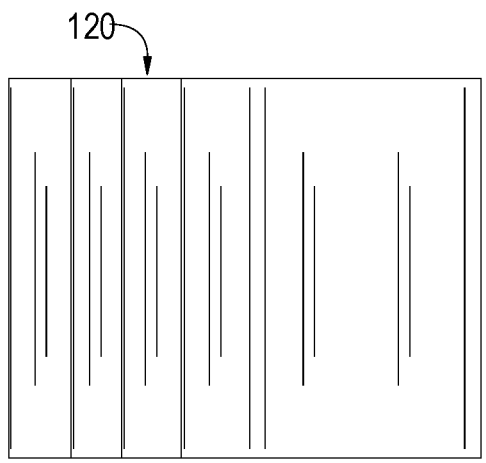
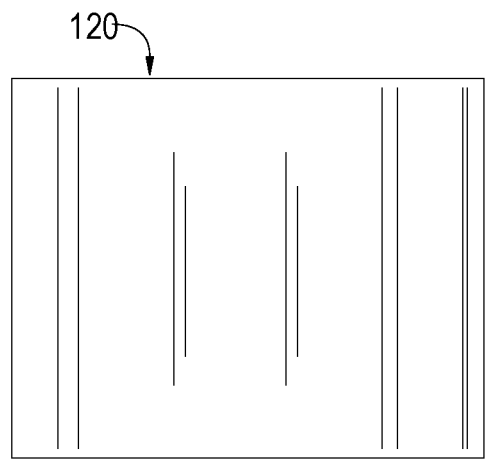
FIG. 23      FIG. 24
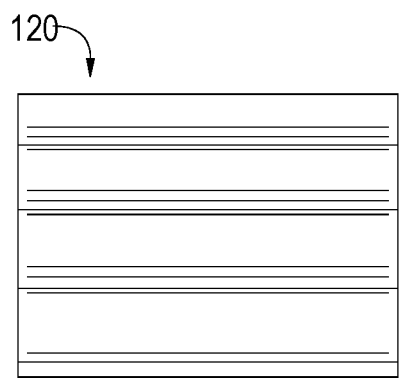
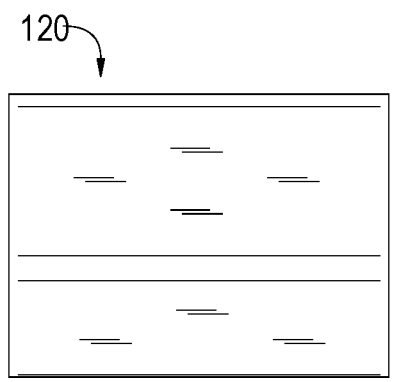
FIG. 25      FIG. 26
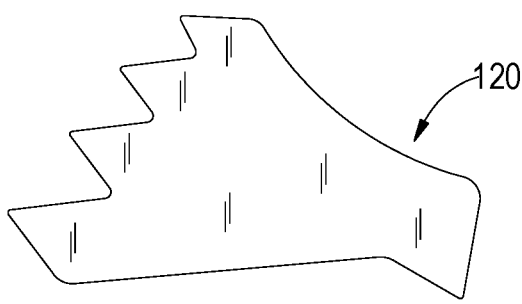
FIG. 27

PIPE JOINT GASKET AND METHOD OF USING SAME

RELATED APPLICATIONS

This application is a continuation of and claims priority to U.S. Design patent application No. 29/801,158 and U.S. Design patent application No. 29/801,157, both titled, "Gasket Segment," and filed on Jul. 27, 2021, the entire contents of which are incorporated herein by reference.

FIELD OF THE INVENTION

The present invention is directed to a pipe joint gasket and more particularly to a pipe joint gasket including rigid segments configured for preventing the separation of interconnected, telescoping pipes fabricated from molecularly oriented polyvinylchloride upon pressurization and over-pressurization thereof.

BACKGROUND OF THE INVENTION

Polyvinylchloride (PVC) pipes in the North America, whether intended for pressurized or non-pressurized applications, often include "locked-in" gaskets, which are commonly referred to Rieber gaskets, for creating water-tight seals between interconnected pipes. A Rieber gasket consists of a continuous steel band either externally or internally bonded to an elastomer annular body. The Rieber gasket is incorporated into a pipe during the belling process and locked into place within an annular groove of the bell. The steel band functions to prevent the gasket from becoming dislodged from the bell.

Rieber gaskets offer very little resistance to axial separation of plastic pipe joints upon fluid pressurization of the joints. To overcome this shortcoming of Rieber joints, restraint harnesses are often used for preventing the withdrawal of plastic spigots from plastic bells. Restraint harnesses consist of two split serrated restraint rings, one secured about the spigot end of one pipe and the other secured about the bell end of another pipe. The restraint rings are fastened into a harness by an array of thrust rods, which are tightened against the ring thereby pressing the pipes together. While restraint harnesses prevent axial separation of plastic pipe joints, the cost of the harnesses and time required to install the harness limit their use.

Pipe joint gaskets including anti-slip segments for preventing the separation of interconnected, telescoping metal pipes in applications where a fluid such as water for fire mains is held under high pressure are known in the art. Exemplary gaskets are described in U.S. Pat. Nos. 5,295,697 and 5,464,228 in which a rubber gasket, serving as a fluid seal, includes toothed metal segments spaced around its inner perimeter. The toothed metal segments bite into the outer surface of the spigot of the inserted pipe and prevent withdrawal of the inserted pipe from a bell end of the other pipe, which can be caused by unbalanced hydrostatic or hydrodynamic forces. Hydrostatic and hydrodynamic forces that are unbalanced within a pipeline are referred to as thrust forces. Thrusts occur whenever there is a change in the direction of flow within a pipeline or the cross-sectional area of the pipeline. A shortcoming of restrained gaskets is that during fluid pressurization or over-pressurization of the interconnected pipes, excessive axial thrust force generated by the resulting hydrostatic pressure can cause the acutely pointed, metal segments to exert destructive radial loads upon the inner surface of the bell end and the outer surface of the spigot end, for example, if the a segment over-rotates within the joint. In many instances, these radial loads are great enough to fracture the spigot and bell ends of the metal pipes. Since toothed, anti-slip segments are known to destructively impinge upon metal pipes, the use of gaskets containing such or similar segments for preventing the separation of interconnected plastic pipes has been limited, especially in high pressure applications.

Another shortcoming of using restrained gaskets in plastic pipe joints is that current metal segments used in pipe gaskets are not configured for addressing the dynamic nature of plastic pipe joints, particularly joints formed by molecularly oriented polyvinylchloride pipes, which exhibit more flexibility than standard PVC pipes. The flexibility of plastic pipes often results in the distance between a spigot outer wall and a bell inner wall of a pipe joint increasing as metal segments exert increased pressure on the bell and spigot in response to axial thrust forces created by pressurization or over-pressurization of pipe joints being directed radially. When that occurs, the effective length of the segments may be insufficient to maintain effective engagement with both the bell and spigot, which allows the segments to over-rotate thereby causing disengagement of the segments and either failure or destruction of the joint.

SUMMARY OF THE INVENTION

The present invention is directed to a method for inhibiting separation of joined plastic pipes by providing within a pipe bell of a first plastic pipe a gasket including rigid, metal segments, each segment having a plurality of bell teeth configured for engaging the bell end and a spigot tooth configured for engaging a spigot end of a second pipe seated in the bell end. Upon pressurization and over-pressurization of the pipe joint, resulting axial forces exerted on the pipe joint, which can cause pipes to separate, are countered by wedging the segments between the bell end and the spigot end and rotating each segment so that the thrust forces are directed both axially to prevent further separation of the pipes and radially to provide the force necessary to cause impingement of the teeth into the pipes.

To prevent pipe joint damage that can be caused by radially-directed thrust forces and over-rotation of the segments and disengagement of the segments with the spigot end and the bell end caused by flexing of the plastic pipe, the bell teeth and the spigot tooth of each segment are adapted and arranged to maintain the load path of the thrust forces carried by each segment within a desired angular range relative to the spigot end so that the requisite amount of axial and radial thrust forces exerted by the segments on the bell end and the spigot end are maintained for preventing separation of the pipes, ensuring engagement of the segments with the spigot end and the bell end and avoiding over penetration of the teeth into the pipes. Each segment is further configured for transferring the load path of the thrust forces exerted to and between the spigot tooth and a bell tooth to between the spigot tooth and an adjacent bell tooth thereby increasing the effective length of the segment, which is necessary for maintaining effective engagement of the segment with the spigot end and the bell end as the distance therebetween increases in response to flexing of the plastic pipes caused by the exertion of the radial thrust forces onto the spigot end and the bell end by the segments. This is accomplished in part by progressively increasing the distances between the vertices of the spigot tooth with the each vertices of each bell tooth, moving radially inward.

According to one aspect of the invention, there is provided a rigid gasket segment for inhibiting separation of a pair of pipes. The segment includes an acutely-pointed spigot tooth configured for engaging a spigot end of a first pipe, the spigot tooth having a spigot tooth vertices, and a plurality of acutely-pointed bell teeth configured for engaging a bell end of a second pipe. In order from a top to a bottom of the segment, the plurality of bell teeth include a first tooth with a first tooth vertices, a second tooth with a second tooth vertices, a third tooth with a third tooth vertices and a fourth tooth with a fourth tooth vertices. Up to eight bell teeth are contemplated. Each bell tooth vertices, relative to the spigot tooth vertices, defines a length measured through the segment including a first length extending to and between the spigot tooth vertices and the first tooth vertices, a second length extending to and between the spigot tooth vertices and the second tooth vertices, a third length extending to and between the spigot tooth vertices and the third tooth vertices and a fourth length extending to and between the spigot tooth vertices and the fourth tooth vertices. The lengths between the bell teeth vertices and the spigot tooth vertices progressively increase moving from the first tooth to the fourth tooth such that second length is greater than the first length, the third length is greater than the second length and the fourth length is greater than the third length.

In one embodiment of the present invention, the spigot tooth includes a front planar face and a rear planar face that intersect at the spigot vertices to form an angle in the range of about 65° to about 75°. Other suitable angles may fall within the range of about 67° to about 73° and about 69° to about 72°. The angle of the spigot vertices is sufficiently large to prevent over penetration of the spigot tooth into the spigot end during over-pressurization of a pipe joint. The angle is also configured for minimizing the amount of the plastic removed from a spigot end as the spigot tooth impinges into the spigot end and translates axially. This is desired since plastic removed by a spigot tooth can cause a seal failure and leakage from a joint by disengaging the gasket from the spigot.

In another embodiment of the present invention, the first length extends along a first plane, the second length extends along a second plane, the third length extends along a third plane and the fourth length extends along a fourth plane, the first plane intersecting the second plane at angle of about 10° to about 15°, the third plane intersecting the first plane at an angle of about 20° to about 30° and the fourth plane intersecting the first plane at an angle of about to about 45°. The angular arrangement of these planes, in conjunction with the progressively increasing lengths between the bell teeth vertices and the spigot tooth vertices acts to maintain the load path of the thrust forces carried by each segment within the desired angular range relative to the spigot, while allowing the transfer the load path of the thrust forces exerted to and between the spigot tooth and a bell tooth to between the spigot tooth and an adjacent bell tooth.

In yet another embodiment of the present invention, each of the first tooth vertices, the second tooth vertices, the third tooth vertices and the fourth tooth vertices is formed by the intersection of planar segment wall portions intersecting at an angle of about 55° to about 65°. The angle of each bell tooth vertices is sufficiently large to prevent over penetration of the bell teeth into the bell end during over-pressurization of a pipe joint.

According to another aspect of the invention, there is provided a method for inhibiting separation of a bell end and a spigot end of a pair of plastic pipes, the bell end including an annular groove having a front wall. The method includes positioning a gasket within the groove and inserting the spigot into the bell end and through the gasket for operatively seating the spigot end within the bell end and thereby forming a complete pipe joint. The gasket includes a plurality of rigid segments embedded within the gasket. Each segment includes a spigot tooth having a spigot tooth vertices configured for engaging the spigot end and a plurality of bell teeth configured for engaging the bell end. The bell teeth consist of a first tooth with a first tooth vertices, a second tooth with a second tooth vertices, a third tooth with a third tooth vertices, and a fourth tooth with a fourth tooth vertices. A first length extends to and between the spigot tooth vertices and the first tooth vertices, a second length extends to and between the spigot tooth vertices and the second tooth vertices, a third length extends to and between the spigot tooth vertices and the third tooth vertices, and a fourth length extends to and between the spigot tooth vertices and the fourth tooth vertices. The second length is greater than the first length, the third length is greater than the second length and the fourth length is greater than the third length. Upon pressurization of the pipe joint, axial thrust forces cause the spigot end to partially withdraw from the bell end and the spigot tooth to impinge upon the spigot end and one or more of the plurality of bell teeth to impinge upon the front wall. As pressure within the pipe joint increases, the segment may rotate in a first direction about the spigot tooth vertices causing additional bell teeth to impinge upon the front wall, and other bell teeth to disengage from the front wall.

In one embodiment of the present invention, the spigot end is partially reinserted into the bell end as the pressure within the pipe joint decreases thereby causing the segment to rotate about the spigot tooth vertices in a second direction that is opposite to the first direction and at least one of the bell teeth of the plurality of bell teeth to disengage from the front wall. As the segment rotates in the first direction, a distance between the spigot tooth vertices and the front wall increases, and as the segment rotates in the second direction, the distance decreases.

In another embodiment of the present invention, partially withdrawing the spigot end from the bell end and rotating the segment in the first direction upon pressurization of the pipe joint causes the first tooth to impinge upon the front wall, followed by the first tooth disengaging from the front wall. The first tooth is caused to reengage and again impinge upon the front wall as pressure in the pipe joint decreases, which causes partial reinsertion of the spigot end into the bell end and rotation of the segment about the spigot tooth vertices in a second direction that is opposite to the first direction.

In yet another embodiment of the invention, the method further includes forming a first segment effective length extending to and between the spigot tooth vertices and the first tooth vertices, followed by forming a second segment effective length extending to and between the spigot tooth vertices and the second tooth vertices, followed by forming a third segment effective length extending to and between the spigot tooth vertices and the third tooth vertices, followed by forming a fourth segment length extending to and between the spigot tooth vertices and the fourth tooth vertices. The segment effective length refers to the length of the segment extending to and between the spigot tooth vertices and the vertices of a bell tooth through which the load path extends, the load path being created by thrust forces resulting by pressurization of the pipe joint and which are exerted on the front wall and the spigot end by the segment. In each instance, the first segment effective length, the second segment effective length, the third segment effective length and the fourth segment effective length extends along a plane that intersects the spigot end to form an angle in the range of about 35° to 45°. Thus, as the segment rotates in the first direction upon pressurization of the pipe joint, the segment effective length increases as the segment rotates in the first direction and transfers the load path from the first tooth to the second tooth, from the second tooth to the third tooth, and from the third tooth to the fourth tooth. Thus, according to the method, the fourth tooth may be impinged upon the front wall while the first tooth and the second tooth are spaced apart from the front wall, the third tooth may be impinged upon the front wall while the first tooth is spaced apart from the front wall or the first tooth and the second tooth may be impinged upon the front wall while the fourth tooth is spaced apart from the front wall.

According to yet another aspect of the invention, there is provided a method for inhibiting separation of a bell end and a spigot end of a pair of pipes, the bell end including an annular groove having a front wall. The method includes positioning a gasket within the groove, the gasket including a rigid segment having a spigot tooth and a plurality of bell teeth, the spigot tooth including a spigot tooth vertices, inserting the spigot end into the bell end and through the gasket, and partially withdrawing the spigot end from the bell end whereby the spigot tooth impinges upon the spigot end, the segment rotates in a first direction about the spigot tooth vertices and one or more of the plurality of bell teeth impinge upon the front wall.

According to one embodiment of the present invention, the method further includes partially reinserting the spigot end into the bell end whereby the segment rotates about the spigot tooth vertices in a second direction that is opposite to the first direction and at least one of the bell teeth of the plurality of bell teeth disengages from the front wall.

According to another embodiment of the present invention, the method includes partially withdrawing the spigot end from the bell end and rotating the segment in the first direction thereby causing a first tooth of the plurality of bell teeth to impinge upon the front wall, followed by the first tooth disengaging from the front wall. The method may also include partially reinserting the spigot end into the bell end whereby the segment rotates about the spigot tooth vertices in a second direction that is opposite to the first direction thereby causing the first tooth to impinge upon the front wall.

According to yet another embodiment of the invention, when the plurality of bell teeth includes a first tooth, a second tooth, a third tooth and a fourth tooth, the first tooth may be impinged on the front wall. Alternatively, the second tooth may be impinged on the front wall, followed by the third tooth and then the fourth tooth impinging on the front wall. The fourth tooth may be impinged on the front wall while the first tooth and the second tooth are spaced apart from the front wall. The third tooth may be impinged on the front wall while the first tooth is spaced apart from the front wall. The first tooth and the second tooth may be impinged on the front wall while the fourth tooth is spaced apart from the front wall.

BRIEF DESCRIPTION OF THE DRAWINGS

FIG. 14 is a top plan view of the gasket segment of FIG. 1.

FIG. 15 is a bottom view of the gasket segment of FIG. 1.

FIG. 16 is an elevational view of the front side of the gasket segment of FIG. 1.

FIG. 17 is an elevational view of the rear side of the gasket segment of FIG. 1.

FIG. 18 is an elevational view a lateral side of the gasket segment of FIG. 1, which is a mirror image of the opposing lateral side thereof.

FIG. 23 is a top plan view of the gasket segment of FIG. 19.

FIG. 24 is a bottom view of the gasket segment of FIG. 19.

FIG. 25 is an elevational view of the front side of the gasket segment of FIG. 19.

FIG. 26 is an elevational view of the rear side of the gasket segment of FIG. 19.

FIG. 27 is an elevational view a lateral side of the gasket segment of FIG. 19, which is a mirror image of the opposing lateral side thereof.

DETAILED DESCRIPTION OF PRESENTLY PREFERRED EMBODIMENTS

Figure 8:
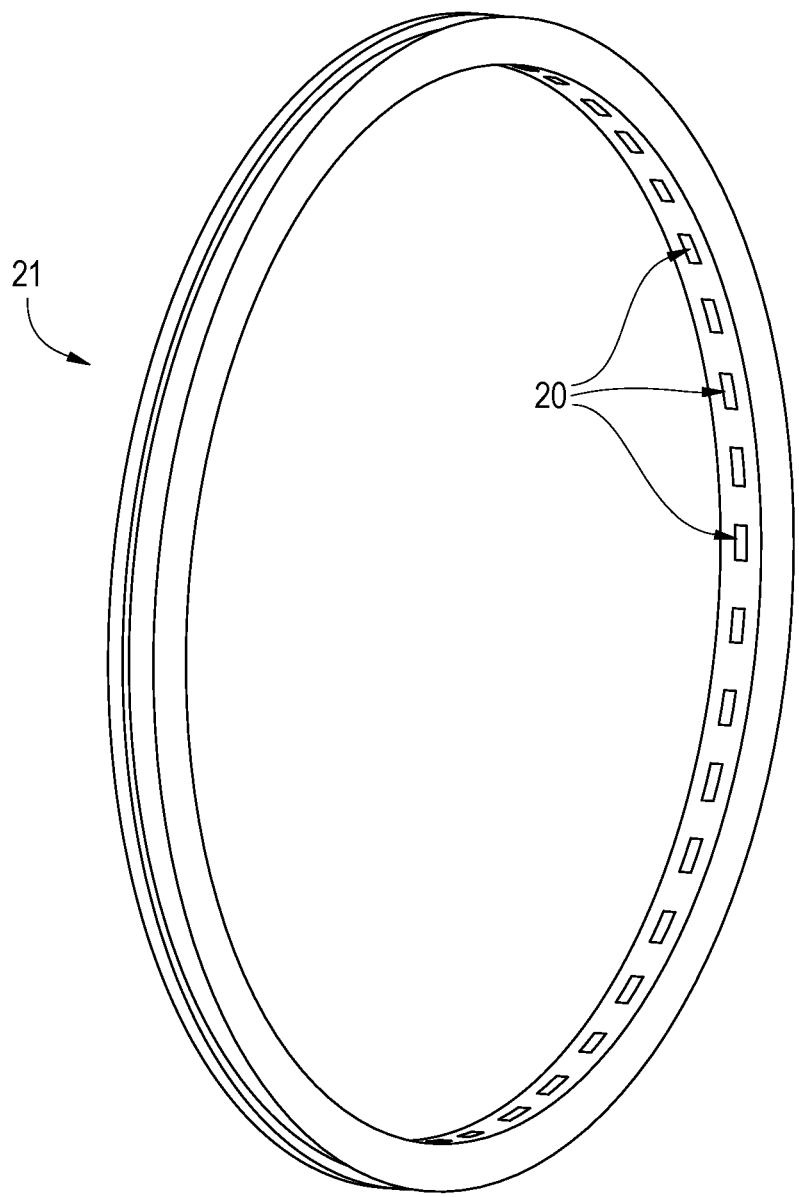
FIG. 8 is a perspective view of a gasket containing a plurality of the gasket segments of FIG. 1 embedded therein.
Figure 9:
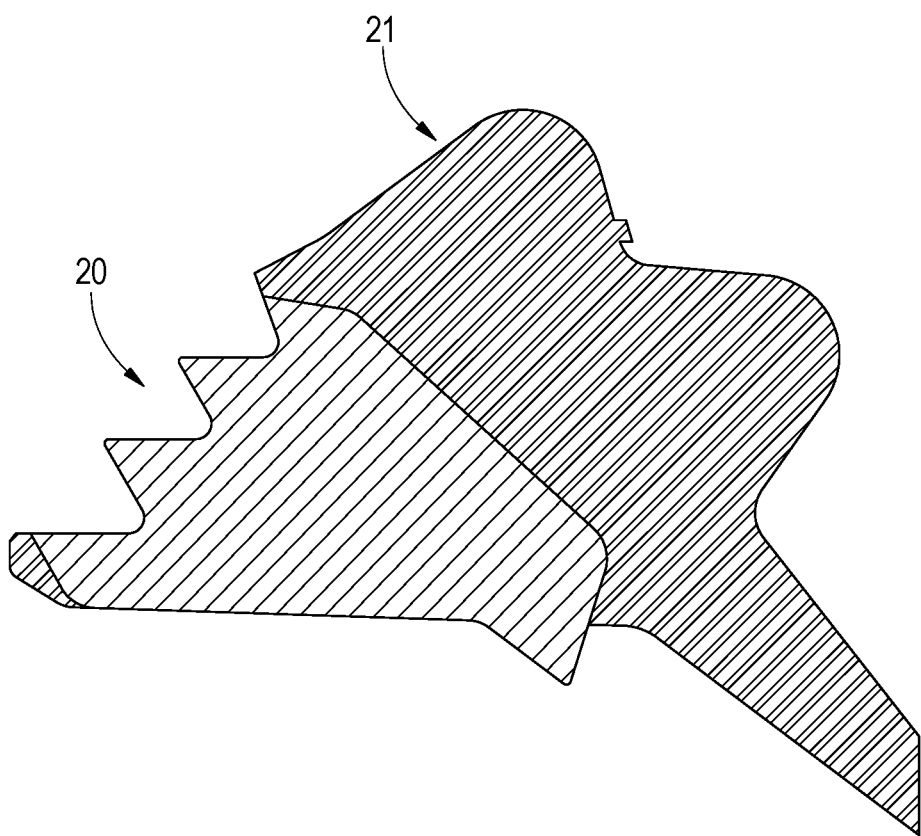
FIG. 9 is a sectional view of the gasket segment of FIG. 1 embedded in an annular gasket.

FIGS. 1 through 7 depict a sectional view of a bell end 16 of one pipe 12 including a gasket 21 (not shown) and a metal gasket segment 20 in accordance with a first embodiment of the present invention, a spigot end 14 of another pipe 10 located within the pipe bell and the operation of gasket 21 upon the fluid pressurization and over-pressurization of a pipe joint 8 created between bell end 16 and spigot end 14. In particular, these figures illustrate the arrangement and operation of metal gasket segments 20 in gasket 21 relative to bell end 16 and spigot end 14 during the formation, fluid pressurizing and fluid over-pressurization of joint 8. FIG. 8 is provided to show the circumferential arrangement and spacing of metal segments 20 throughout gasket 21. FIG. 9 is a sectional view of gasket 21 through segment 20. FIGS. 10 through 18 depict various views of segment 20, and FIGS. 19 through 27 depict various views of a gasket segment 120 in accordance with a second embodiment of the present invention.

Generally, gasket 21 is arranged for inhibiting leakage about joint 8 between the inside walls of bell end 16 and the outside wall of spigot end 14. More particularly, as illustrated in FIGS. 1 through 7, the inner surface of bell end 16 includes a retainer annular groove 18 bounded by a radially extending front wall 17 and radially extending rear wall 15. Though not shown, gasket 21 is positioned within retainer annular groove 18 with bell teeth 22 thereof being arranged adjacent to front wall 17 and a spigot tooth 24 arranged against rear wall 15.

Inserted into gasket 21 are a plurality of metal segments 20. As depicted in FIG. 8, segments 20 are spaced apart equally in a circumferential direction around the periphery of gasket 21. Metal segments 20 are firmly vulcanized into radial grooves found within gasket 21. The number of metal segments 20 inserted into gasket 21 varies depending upon the anticipated fluid pressure at joint 8 and the size of the pipes involved.

Figure 1:
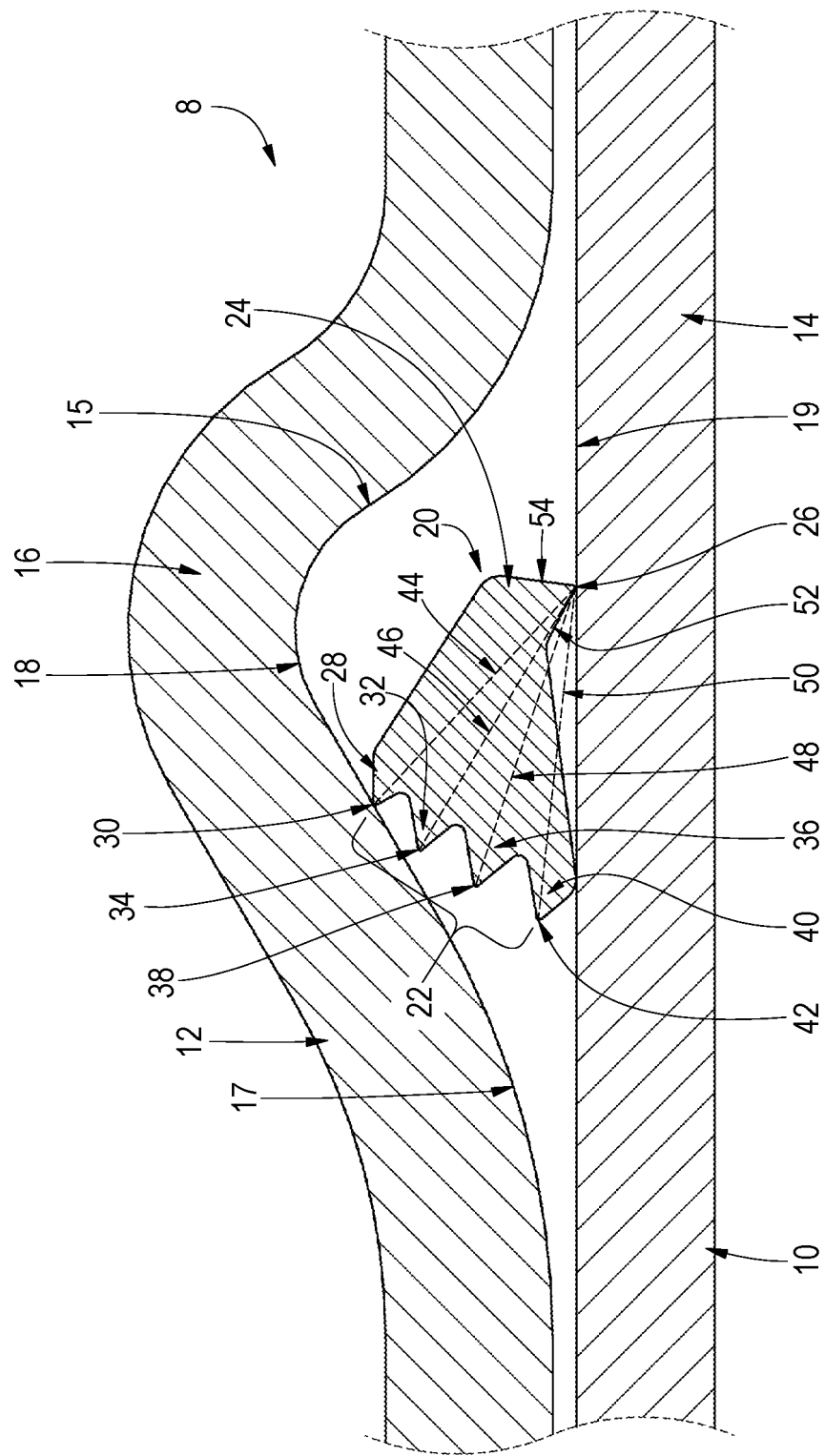
FIG. 1 is a sectional view of a spigot end of a first pipe fully seated in a bell end of a second pipe and a gasket segment in accordance with the present invention located within an annular groove of the bell end.

Referring to FIG. 1, pipe joint 8 is depicted as a connection between a first pipe 10 and a second pipe 12. Pipes compatible with the present disclosure may be plastic, polymer, or metal pipes. In some embodiments, pipes are composed of polyvinylchloride (PVC), or more specifically, molecularly oriented PVC. Compatible pipes may have various dimensions, including lengths, radii, and wall thicknesses, depending upon the desired application.

In FIG. 1, first pipe 10 includes a spigot end 14 that is configured to be inserted within a bell end 16 of second pipe 12. The dimensions of spigot end 14 are such that it fits snugly within bell end 16. For instance, a radius including the outer walls of first pipe 10 at spigot end 14 is equal to or slightly less than a radius including the inner walls of second pipe 12 at bell end 16. Upon insertion, spigot end 14 of first pipe 10 sits within bell end 16 of second pipe 16. To secure the connection between first pipe 10 and second pipe 12 and form joint 8, gasket 21 is held within the annular groove 18 of bell end 16. After positioning gasket 21 within annular groove 18 and inserting spigot end 14 into bell end 16 and through gasket 21, complete pipe joint 8 is formed.

In FIG. 1, a gasket segment 20 of gasket 21 is depicted. Details regarding the arrangement of gasket segments 21 within gasket 20 are provided below.

Gasket 21 includes a circumferential arrangement of rigid metal segments 20 embedded within gasket 21, with each segment 20 having a plurality of bell teeth 22 and a spigot tooth 24. Bell teeth 20 are acutely-pointed and are configured to impinge upon a front wall 17 of bell end 16. The number of bell teeth shown in the exemplary first embodiment in FIG. 1 is four; however, other numbers of bell teeth are contemplated. For instance, up to eight bell teeth are compatible with the present disclosure. Each tooth of bell teeth 22 includes vertices, where each vertices is positioned to generally face front wall 17 when gasket 21 is in position within annular groove 18. One or more of the plurality of bell teeth 22 may contact or bite into front wall 17 of bell end 16, as will be discussed in greater detail below.

In the first embodiment depicted in FIG. 1, first bell tooth 28, second bell tooth 32, third bell tooth 36, and fourth bell tooth 40 have corresponding vertices: first bell tooth vertices 30, second bell tooth vertices 34, third bell tooth vertices 38, and fourth bell tooth vertices 42. Each of first tooth vertices 30, second tooth vertices 34, third tooth vertices 38, and fourth tooth vertices 42 is formed by the intersection of planar segment wall portions of gasket segment 20, with the wall portions intersecting at an angle of about 55° to about 65°. In some instances, the angle of first tooth vertices 30, second tooth vertices 34, third tooth vertices 38, and fourth tooth vertices 42 is the same, while in other instances the angles are different for one or more of first tooth vertices 30, second tooth vertices 34, third tooth vertices 38, and fourth tooth vertices 42. The angle of each bell tooth vertices is sufficiently large to prevent over penetration of bell teeth 22 into bell end 16 during an over-pressurization event at pipe joint 8. Each of bell teeth 22 in FIG. 1 are depicted as being separated from adjacent bell teeth 22 by an intermediate distance, which is approximately equal to other intermediate distances between bell teeth 22. However, in instances not depicted, intermediate distances between adjacent bell teeth 22 vary. The extension of bell teeth 22 from gasket segment 20 and the intermediate distances between adjacent bell teeth 22 may be greater or less than those depicted in the embodiment in FIG. 1.

Spigot tooth 24 is acutely-pointed and configured to impinge upon rear wall 15 of spigot end 14. Spigot tooth 24 includes tooth vertices 26, which is positioned to generally face rear wall 15 when gasket 21 is in position within annular groove 18. Spigot tooth 24 may contact or bite into rear wall 15 of spigot end 14, as will be discussed in greater detail below.

Spigot tooth vertices 26 is formed by the intersection of a front planar face 52 and a rear planar face 54 to form an angle in the range of about 65° to about 75°. Other suitable angles may fall within the range of about 67° to about 73° and about 69° to about 72°. The angle of spigot vertices 26 is sufficiently large to prevent over penetration of spigot tooth 24 into spigot end 14 during an over-pressurization event at pipe joint 8. The angle is also configured for minimizing the amount of the plastic removed from spigot end 14 as spigot tooth 24 impinges into spigot end 14 and translates axially. This is desired because plastic removed by spigot tooth 24 can cause a seal failure and leakage from joint 8 by disengaging gasket 21 from spigot end 14. The extension of spigot tooth 24 from gasket segment 20 may be greater or less than that depicted in the embodiment in FIG. 1.

Each bell tooth vertices, relative to spigot tooth vertices 26, defines a length measured through gasket segment 20 including a first length 44 extending to and between spigot tooth vertices 26 and first tooth vertices 30, a second length 46 extending to and between spigot tooth vertices 26 and second tooth vertices 34, a third length 48 extending to and between spigot tooth vertices 26 and third tooth vertices 38, and a fourth length 50 extending to and between spigot tooth vertices 26 and fourth tooth vertices 42. The lengths between the bell teeth vertices and spigot tooth vertices 26 progressively increase moving from first tooth 28 to fourth tooth 40 such that second length 46 is greater than first length 44, third length 48 is greater than second length 46 and fourth length 50 is greater than third length 48. In some instances, there is included a plurality of segment effective lengths, where a segment effective length refers to a length of gasket segment 20 extending to and between spigot tooth vertices 26 and the vertices of a bell tooth 22 through which the load path extends, the load path being created by thrust forces resulting by pressurization of pipe joint 8 and which are exerted on front wall 17 and spigot end 14 by gasket segment 20. In each instance, first segment effective length, second segment effective length, third segment effective length, and fourth segment effective length extend along a plane that intersects spigot end 14 to form an angle in the range of about 35° to 45°.

In some embodiments, first length 44 extends along a first plane, second length 46 extends along a second plane, third length 48 extends along a third plane, and fourth length 50 extends along a fourth plane, the first plane intersecting the second plane at angle of about 10° to about 15°, the third plane intersecting the first plane at an angle of about 20° to about 30° and the third plane intersecting the first plane at an angle of about 30° to about 45°. The angular arrangement of these planes, in conjunction with the progressively increasing lengths between bell teeth vertices and spigot tooth vertices 26 acts to maintain the load path of the thrust forces carried by each gasket segment 20 within the desired angular range relative to spigot end 14, while allowing the transfer the load path of the thrust forces exerted to and between spigot tooth 24 and a bell tooth to between spigot tooth 24 and an adjacent bell tooth. The maintenance of the load path of the thrust forces is described in greater detail below.

Upon pressurization and over-pressurization of pipe joint 8, resulting axial forces may be exerted pipe joint 8, which can cause first and second pipes 10, 12 to separate when gasket 21 is not in place. However, with gasket 21, these forces are countered by wedging gasket segments 20 between bell end 16 and spigot end 14 and rotating each segment 21 so that the thrust forces are directed both axially, to prevent further separation of pipes 10, 12, and radially to provide the force necessary to cause impingement of at least one of bell teeth 22 into bell end 16 and spigot tooth 24 into spigot end 14. Gasket 21 further prevents separation of pipes by ensuring engagement of gasket segments 20 with spigot end 14 and bell end 16 and avoiding over penetration of spigot tooth 24 and/or bell teeth 22 into the pipes.

Thus, upon pressurization, gasket 21 with segments 20 is configured to form a wedge between bell end 16 and spigot end 14 through the rotation of each segment 20. Spigot tooth 24 is configured to impinge upon spigot end 14, while one or more of the plurality of bell teeth 22 are configured to impinge upon front wall 17. As pressure within pipe joint 8 increases, gasket segment 20 is configured to rotate in a first direction about spigot tooth vertices 26, causing additional bell teeth to impinge upon front wall 17, and other bell teeth to disengage from front wall 17. For instance, first tooth 28 may be impinged on front wall 17. Alternatively, second tooth 32 may be impinged on front wall 17, followed by third tooth 36 and then fourth tooth 40 impinging on front wall 17. Fourth tooth 40 may be impinged on front wall 17 while first tooth 28 and second tooth 32 are spaced apart from front wall 17. Third tooth 36 may be impinged on front wall 17 while first tooth 28 is spaced apart from front wall 17. First tooth 28 and second tooth 32 may be impinged on front wall 17 while fourth tooth 40 is spaced apart from front wall 17. Further, as gasket segment 20 rotates in the first direction upon pressurization of pipe joint 8, the segment effective length is configured to increase as gasket segment 20 rotates in the first direction. Moreover, gasket segment 20 is configured to transfer the load path from first tooth 28 to second tooth 32, from second tooth 32 to third tooth 36, and from third tooth 36 to fourth tooth 40. In the following FIGS. 2-7, gasket segment rotation is shown at different stages from different amounts of pressurization of pipe gasket 8, with spigot tooth 24 and bell teeth 22 impinging on or retracting from pipe walls as a result of the rotation. Increasing pressure on pipe joint 8 is depicted from FIG. 2 to FIG. 7. FIGS. 2-7 are exemplary of the operation of gasket segment 20 to prevent or inhibit pipe separation upon pressurization of pipe joint 8.

Figure 2:
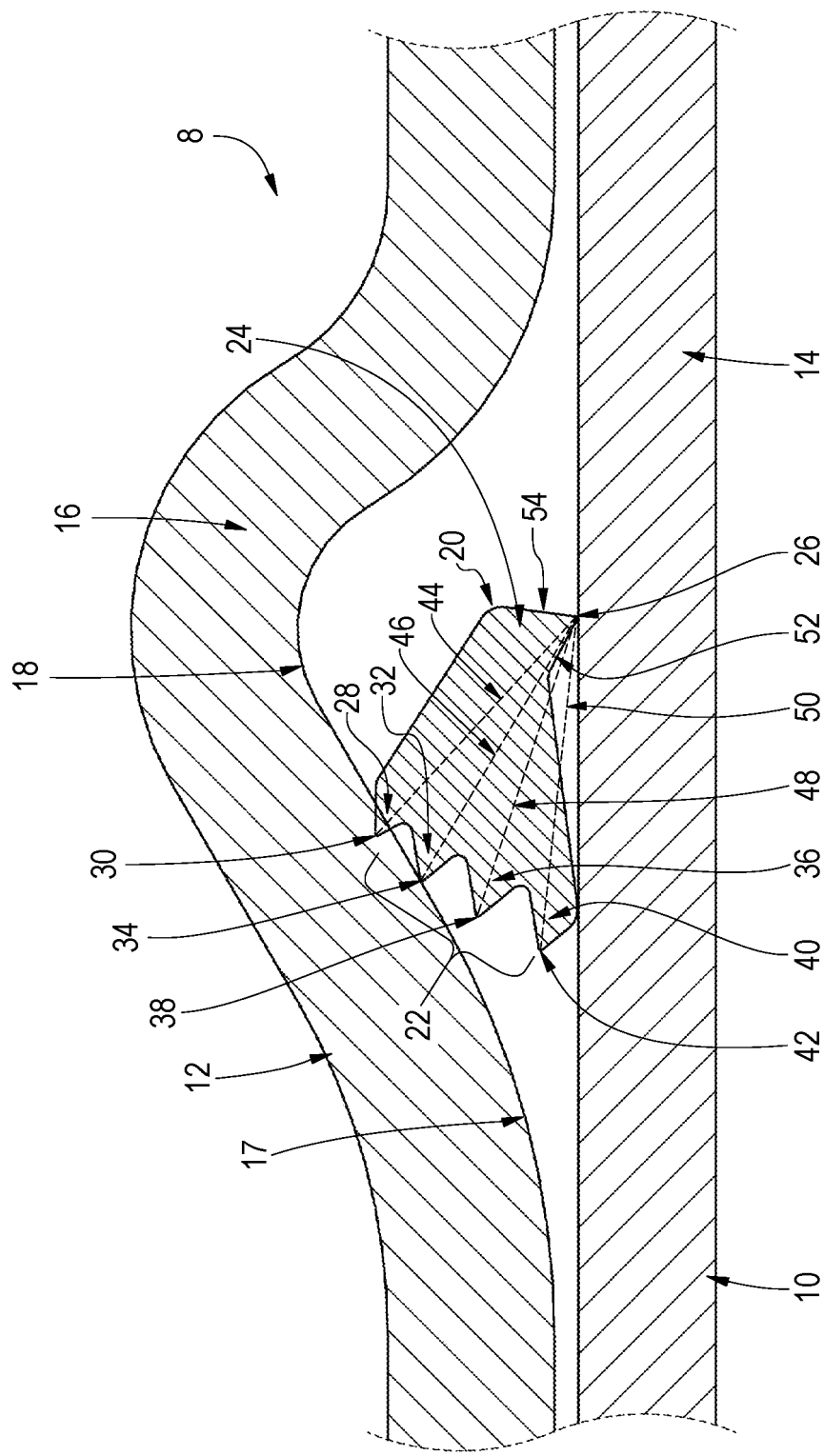
FIG. 2 is a sectional view of the pipe joint of FIG. 1 showing impingement of a first bell tooth of the gasket segment on a front wall of the annular groove during initial pressurization of the pipe joint.

In FIG. 2, pressurization of pipe joint 8 results in axial thrust forces that cause spigot end 14 to partially withdraw from bell end 16. The pressurization causes gasket segment 20 to rotate in a first direction about spigot tooth vertices 26. Consequently, one or more of the plurality of bell teeth 22 impinges upon front wall 17 of bell end 16. In FIG. 2, first tooth 28 impinges on front wall 17 of annular groove 18 upon initial pressurization of pipe joint 8.

Figure 3:
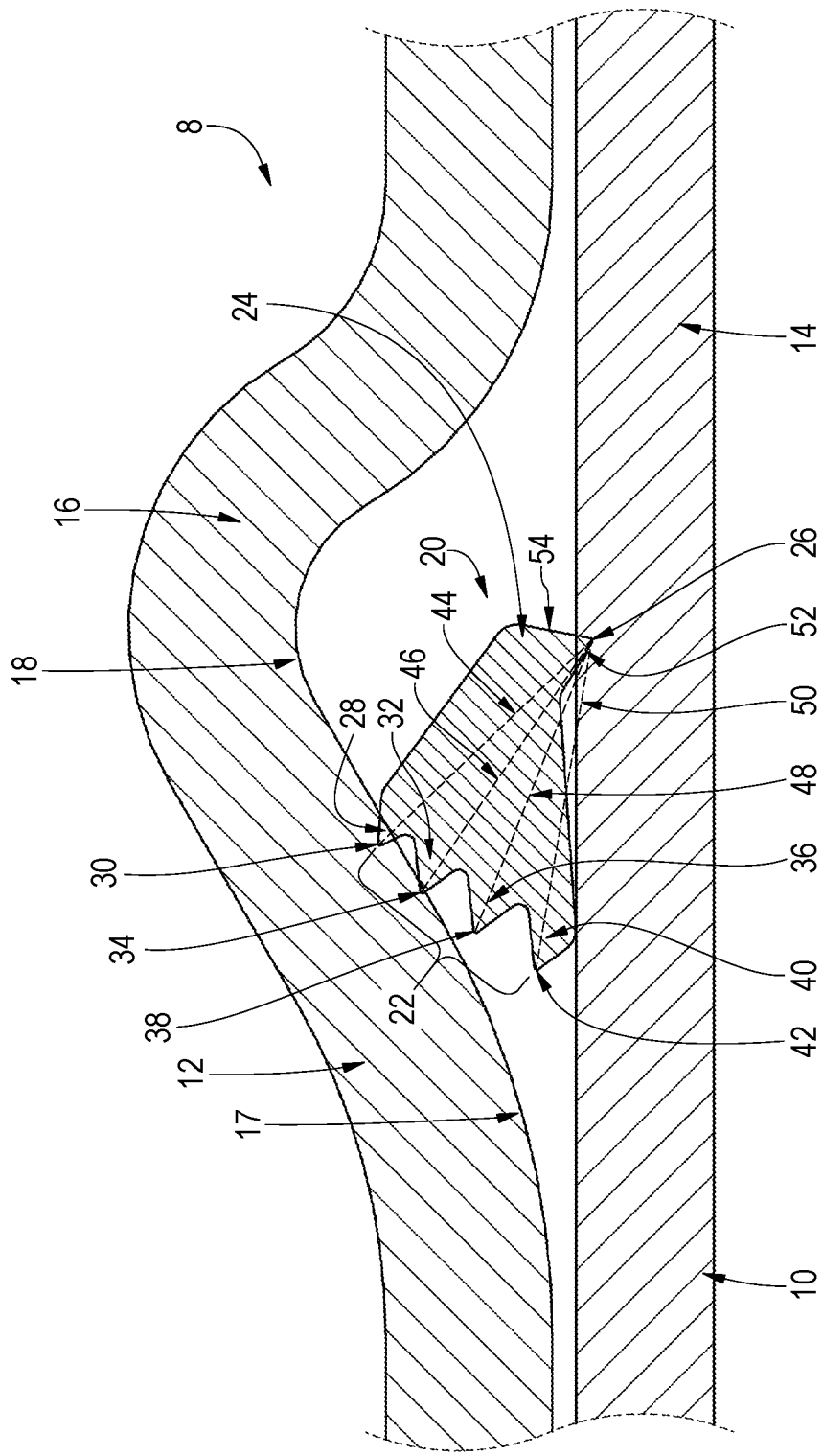
FIG. 3 is a sectional view of the pipe joint of FIG. 2 showing impingement of the first bell tooth of the gasket segment on the front wall of the annular groove and impingement of a spigot tooth of the gasket segment on the spigot end during initial pressurization of the pipe joint.

In FIG. 3, gasket segment 20 continues to rotate in the first direction upon continued pressurization of pipe joint 8. Spigot tooth 24 impinges on rear wall 15 as a result of the gasket segment rotation relative to that of FIG. 2. Further, first tooth 28 remains impinged on front wall 17 of annular groove 18.

Figure 4:
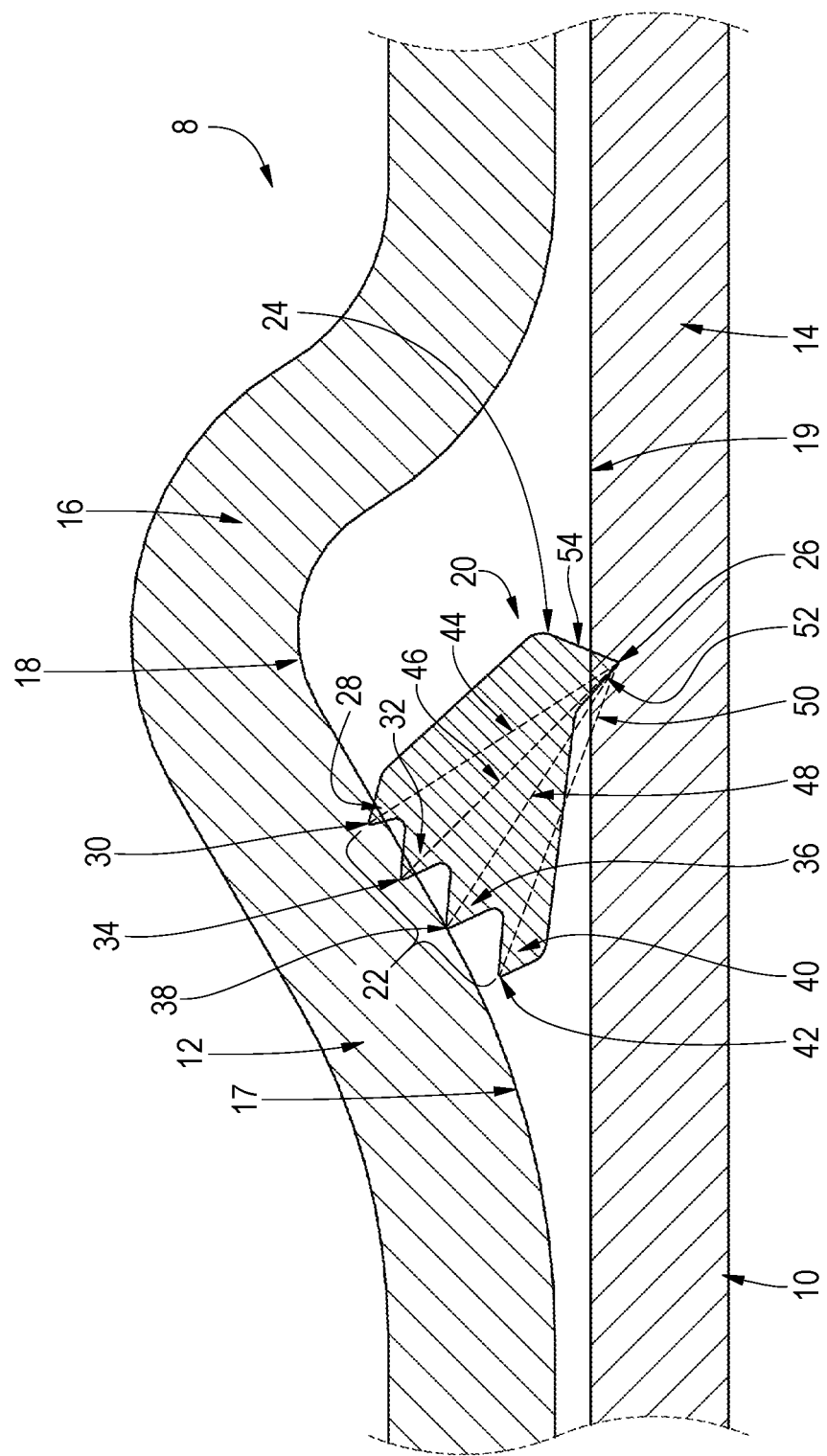
FIG. 4 is a sectional view of the pipe joint of FIG. 3 showing impingement of the first bell tooth and a second bell tooth of the gasket segment on the front wall of the annular groove and impingement of the spigot tooth of the gasket segment on the spigot end as the segment rotates about a vertices of the spigot tooth in a first direction during pressurization of the pipe joint.

In FIG. 4, gasket segment 20 continues to rotate in the first direction upon continued pressurization of pipe joint 8, with gasket segment effective length increasing as gasket segment 20 rotates in the first direction and at least partially transfers the load path from first tooth 28 to second tooth 32. Thus, gasket segment effective length increases in the depicted instance because the load path is at least partially transferred from first tooth 28 with first length 44 to second tooth 32 with second length 46, where second length 46 is greater than first length 44. Further, spigot tooth 24 bites further into rear wall 15 due to gasket segment rotation relative to the FIG. 3. First tooth 28 and second tooth 32 are impinged on front wall 17, while fourth tooth is spaced apart from front wall 17.

Figure 5:
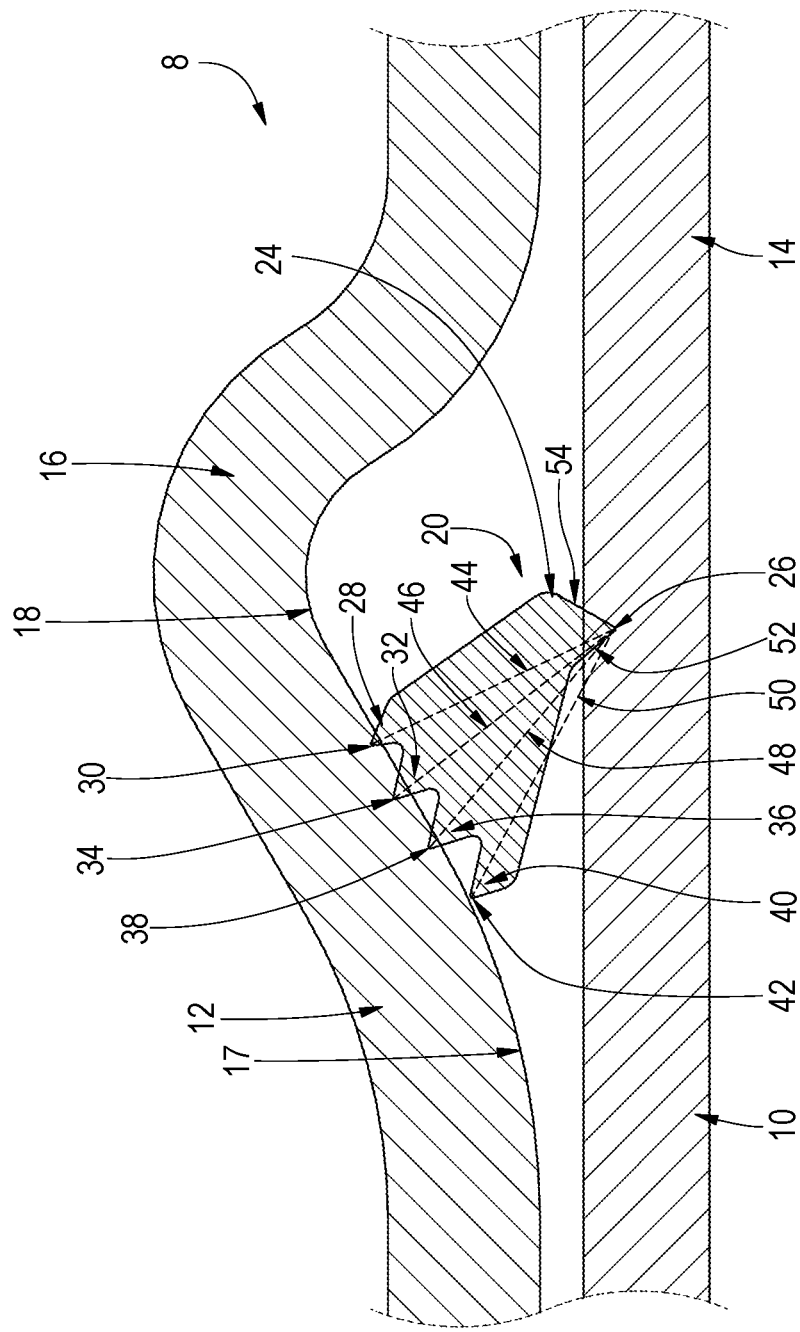
FIG. 5 is a sectional view of the pipe joint of FIG. 4 showing impingement of the first bell tooth, the second bell tooth and a third bell tooth of the gasket segment on the front wall of the annular groove and impingement of the spigot tooth of the gasket segment on the spigot end as the segment rotates further about the vertices of the spigot tooth in the first direction during pressurization of the pipe joint.

In FIG. 5, gasket segment 20 continues to rotate in the first direction upon continued pressurization of pipe joint 8, with gasket segment effective length increasing as gasket segment rotates in the first direction and at least partially transfers the load path from second tooth 32 to third tooth 36. Thus, gasket segment effective length increases in the depicted instance because the load path is at least partially transferred from second tooth 32 with second length 46 to third tooth 36 with third length 48, where third length 48 is greater than second length 46. Further, spigot tooth 24 bites further into rear wall 15 due to gasket segment rotation relative to the FIG. 4. First tooth 28, second tooth 32, and third tooth 36 are impinged on front wall 17, while fourth tooth 40 is spaced apart from front wall 17.

Figure 6:
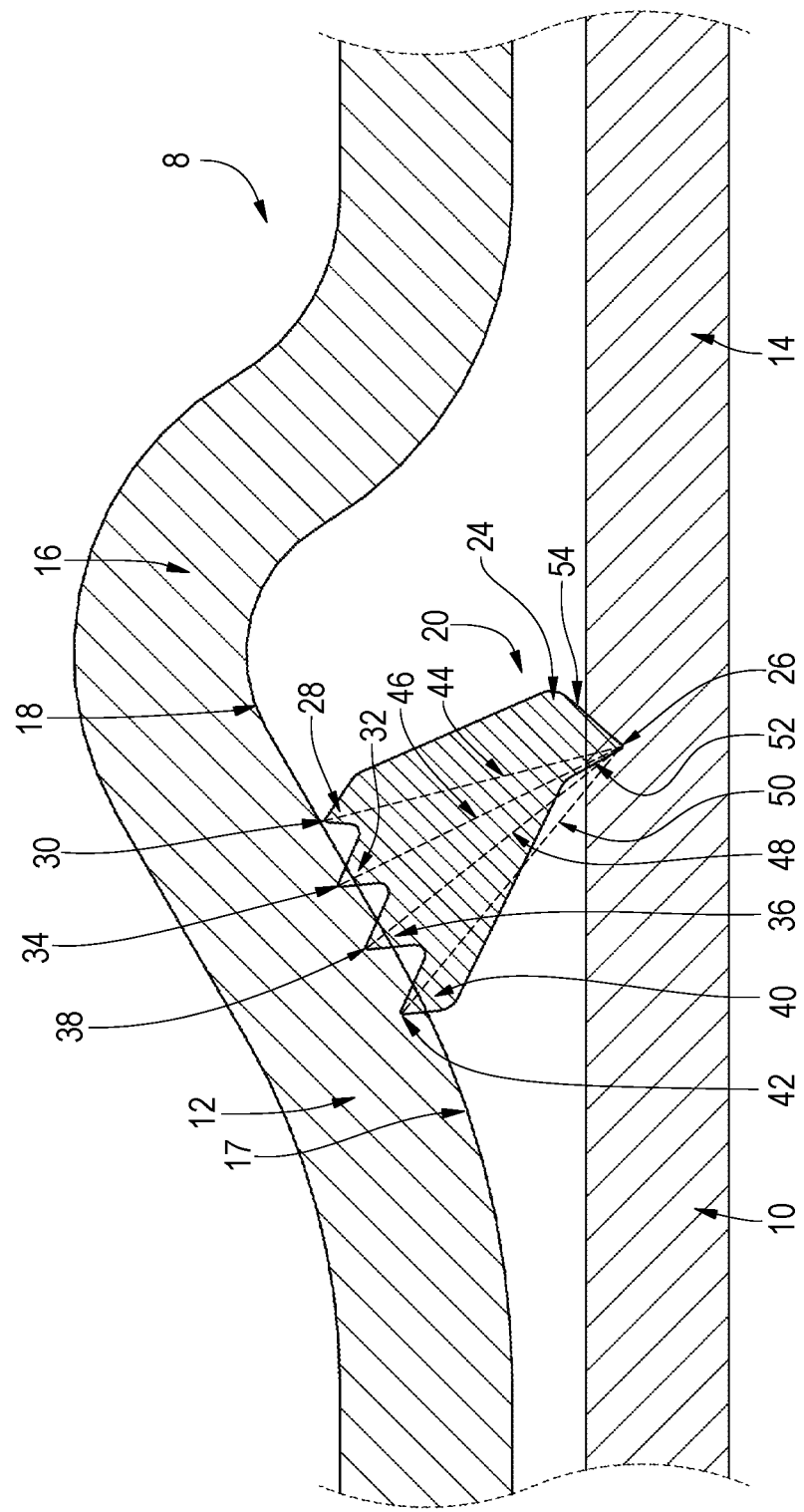
FIG. 6 is a sectional view of the pipe joint of FIG. 5 showing impingement of the second bell tooth, the third bell tooth and a fourth bell tooth of the gasket segment on the front wall of the annular groove, impingement of the spigot tooth of the gasket segment on the spigot end and disengagement of the first tooth from the front wall as the segment rotates about the vertices of the spigot tooth in the first direction during pressurization of the pipe joint.

In FIG. 6, gasket segment 20 continues to rotate in the first direction upon continued pressurization of pipe joint 8, with gasket segment effective length increasing as gasket segment rotates in the first direction and at least partially transfers the load path from second tooth 32 and/or third tooth 36 to fourth tooth 40. Thus, gasket segment effective length increases in the depicted instance because the load path is at least partially transferred from second tooth 32 with second length 46 and/or third tooth 36 with third length 48 to fourth tooth 40 with fourth length 50, where fourth length 50 is greater than third length 48, which is greater than second length 46. First tooth 28 becomes disengaged from bell end 16 due to the rotation. Further, spigot tooth 24 bites further into rear wall 15 due to gasket segment rotation relative to the FIG. 5. Second tooth 32, third tooth 36, and fourth tooth 40 are impinged on front wall 17.

Figure 7:
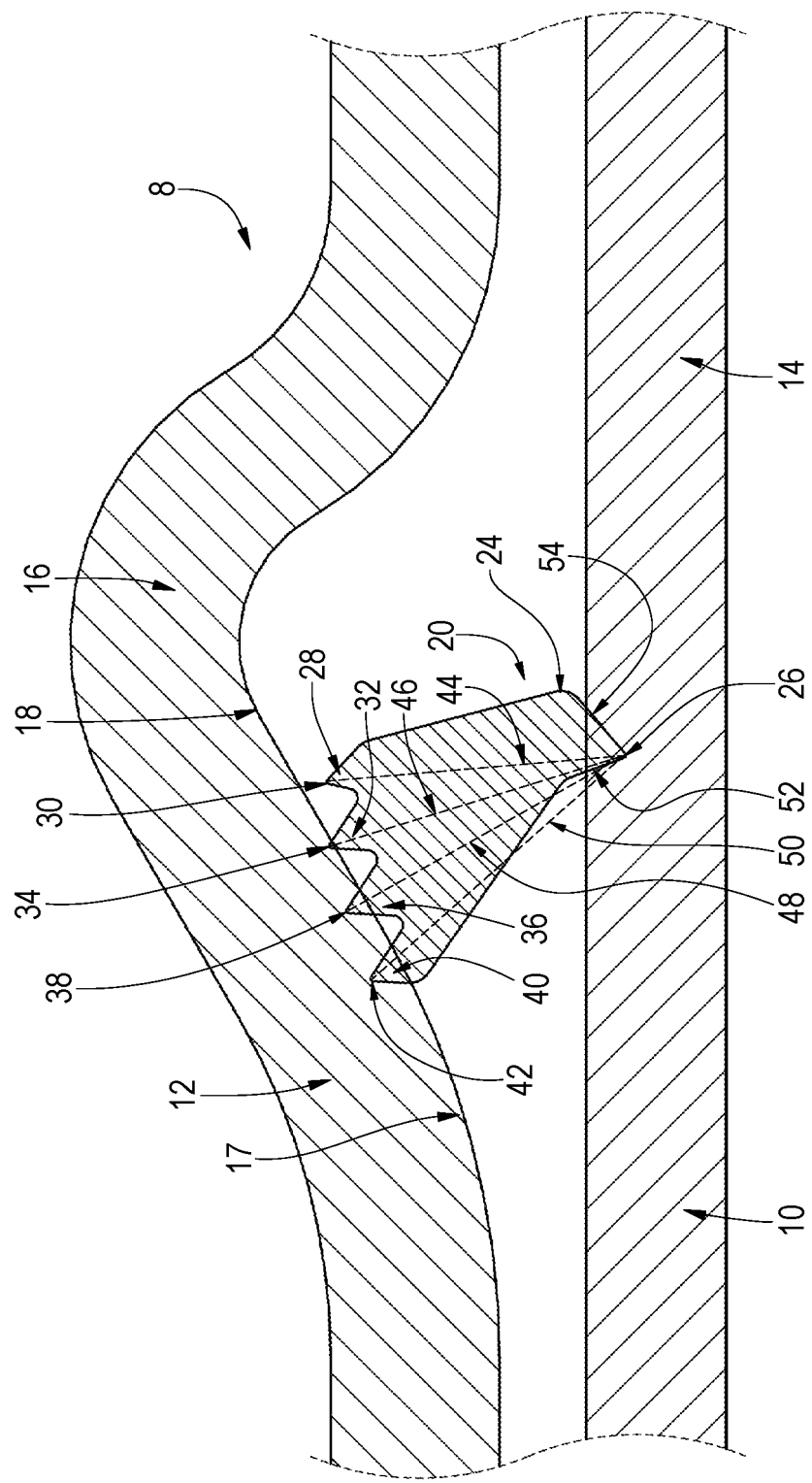
FIG. 7 is a sectional view of the pipe joint of FIG. 6 showing impingement of the third bell tooth and a fourth bell tooth of the gasket segment on the front wall of the annular groove, impingement of the spigot tooth of the gasket segment on the spigot end and disengagement of the first tooth and the second tooth from the front wall as the segment rotates further about the vertices of the spigot tooth in the first direction during pressurization of the pipe joint.

In FIG. 7, gasket segment 20 continues to rotate in the first direction upon continued pressurization of pipe joint 8, with gasket segment effective length increasing as gasket segment 20 rotates in the first direction and at least partially transfers the load path from third tooth 36 to fourth tooth 40. Thus, gasket segment effective length increases in the depicted instance because the load path is at least partially transferred from third tooth 36 with third length 48 to fourth tooth 40 with fourth length 50, where fourth length 50 is greater than third length 48. Second tooth 32 becomes disengaged from bell end 16 due to the rotation. Further, spigot tooth 24 bites further into rear wall 15 due to gasket segment rotation relative to the FIG. 6. Third tooth 36 and fourth tooth 40 are impinged on front wall 17, while first tooth 28 is spaced apart from front wall 17. In some embodiments, first tooth 28 and second tooth 32 are spaced apart from front wall 17 while third tooth 36 and fourth tooth 40 are impinged on front wall 17.

In some instances, spigot end 14 is partially reinserted into bell end 16 as the pressure within pipe joint 8 decreases, thereby causing gasket segment 20 to rotate about spigot tooth vertices 26 in a second direction that is opposite to the first direction. In such an instance, at least one of the bell teeth of the plurality of bell teeth 22 is configured to disengage from front wall 17. For example, if pressure decreases on pipe joint 8, such as depicted in FIG. 4 relative to FIG. 5, a bell tooth such as third tooth 36 become disengaged from front wall 17. Thus, as gasket segment 20 rotates in the first direction, a distance between spigot tooth vertices 26 and front wall 17 increases, and as gasket segment rotates in the second direction, the distance decreases.

In some instances, partially withdrawing spigot end 14 from bell end 16 and rotating gasket segment 20 in the first direction upon pressurization of pipe joint 8 causes first tooth 28 to impinge upon front wall 17, followed by first tooth 28 disengaging from front wall 17. First tooth 28 is caused to reengage and again impinge upon front wall 17 as pressure in pipe joint 8 decreases, which causes partial reinsertion of spigot end 14 into bell end 16 and rotation of gasket segment 20 about spigot tooth vertices 26 in a second direction that is opposite to the first direction.

Referring now to FIG. 8, the circumferential arrangement and spacing of metal segments 20 throughout gasket 21 is depicted. Gasket 21 is an annular disc, with segments 20 that are spaced apart in a circumferential direction around the periphery of gasket 21. The spacing of segments 20 is equal in some instances, while in other instances the spacing is varied between segments 20. Metal segments 20 are firmly vulcanized into radial grooves found within gasket 21. Radial grooves are sized to accept the placement of segments 20. The number, spacing, and size of metal segments 20 inserted into gasket 21 varies depending upon the anticipated fluid pressure at joint 8 and the size of the pipes involved.

Figure 10:
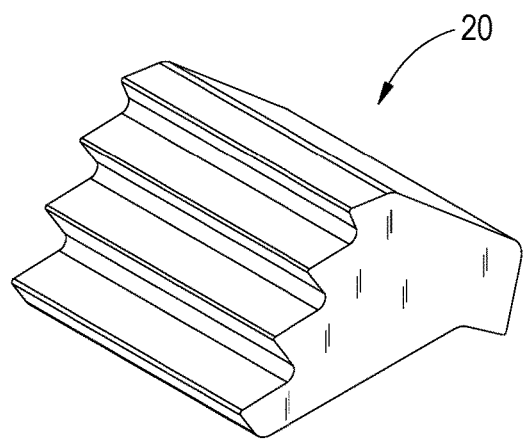
FIG. 10 is a perspective view of a front side of the gasket segment of FIG. 1.
Figure 11:
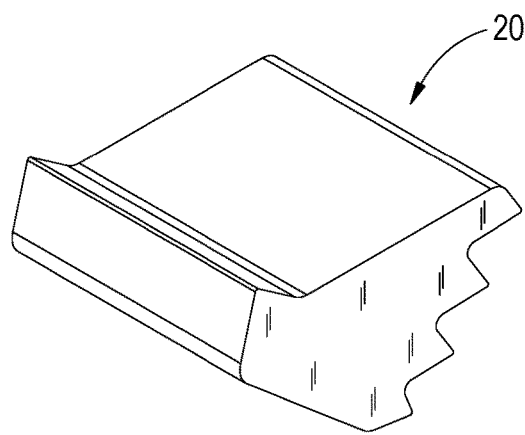
FIG. 11 is a perspective view of a bottoms side of the gasket segment of FIG. 1.
Figure 12:
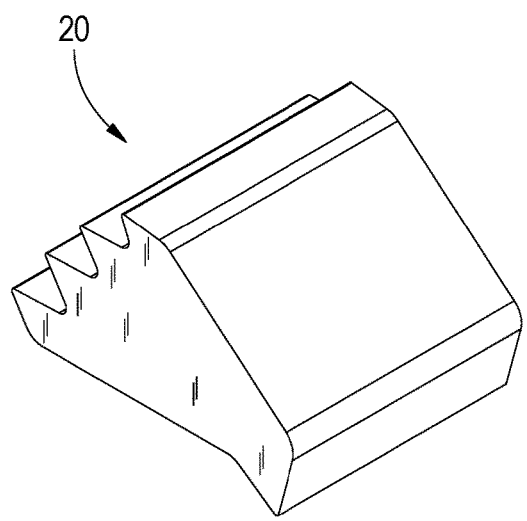
FIG. 12 is a perspective view of a rear side of the gasket segment of FIG. 1.
Figure 13:
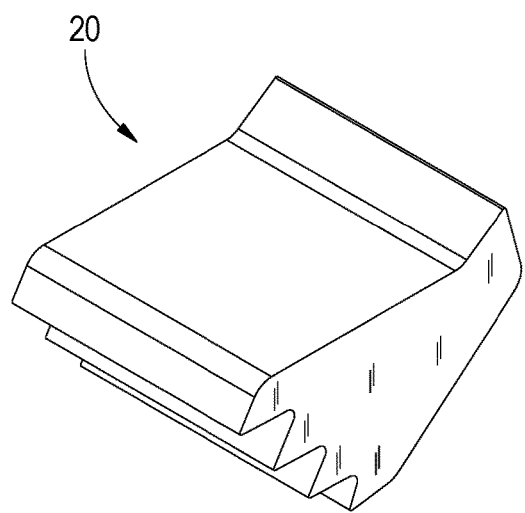
FIG. 13 is another perspective view of the bottom side of the gasket segment of FIG. 1.

In FIG. 9, a sectional view of gasket segment 20 of FIG. 1 is shown. FIG. 10 depicts sectional gasket 20 from a front side, FIG. 11 from a first bottom side, FIG. 12 from a rear side, and FIG. 13 from a second bottom side. In FIG. 14, a top plan view of gasket segment 20 is shown, while a bottom view is shown in FIG. 15, a front side view is shown in FIG. 16, a rear side view is shown in FIG. 17, and a lateral side view is shown in FIG. 18.

Figure 19:
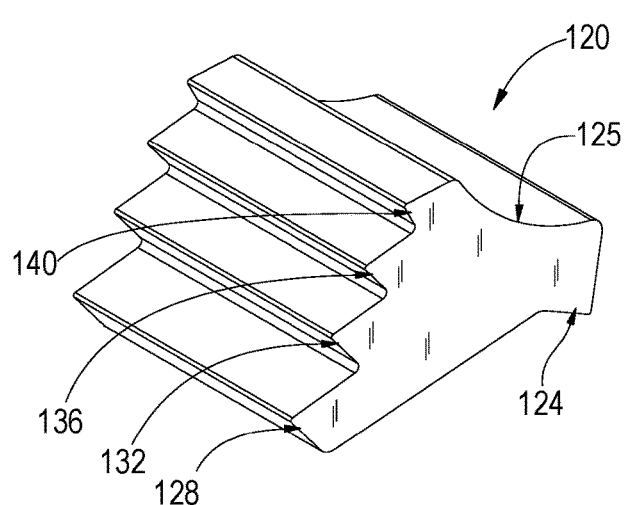
FIG. 19 is a perspective view of a front side of gasket segment in accordance with a second embodiment of the present invention.
Figure 20:
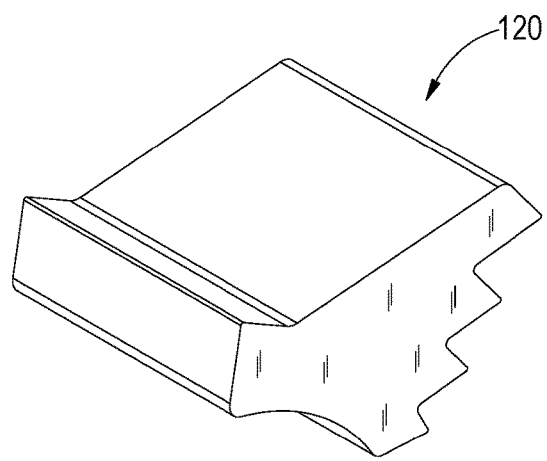
FIG. 20 is a perspective view of a bottoms side of the gasket segment of FIG. 19.
Figure 21:
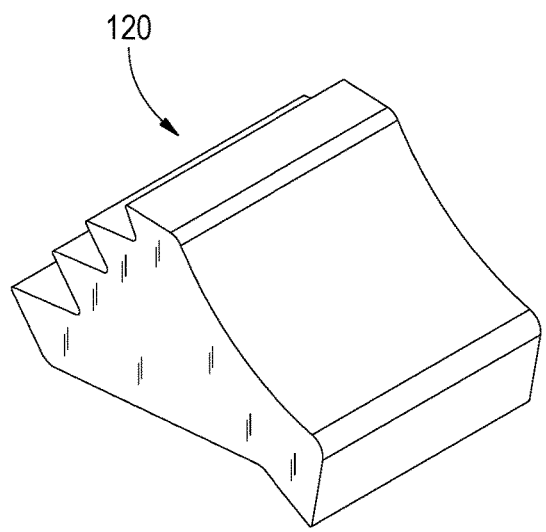
FIG. 21 is a perspective view of a rear side of the gasket segment of FIG. 19.
Figure 22:
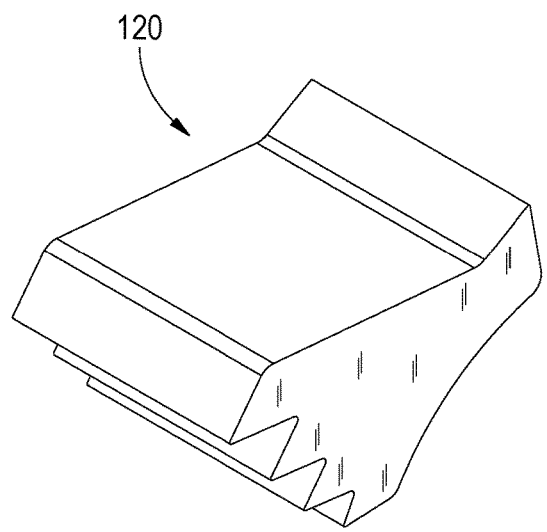
FIG. 22 is another perspective view of the bottom side of the gasket segment of FIG. 19.

In FIGS. 19-27, a second embodiment of gasket segment 120 of gasket 121 is depicted. FIG. 19 shows a front side view of gasket segment 120, FIG. 20 shows a bottom side view, FIG. 21 shows a rear side view, FIG. 22 shows another bottom side view, FIG. 23 shows a top plan view, FIG. 24 shows a bottom view, FIG. 25 shows a front side view, FIG. 26 shows a rear side view, and FIG. 27 shows a lateral side view of gasket segment 120. The second embodiment includes a first bell tooth 128, a second bell tooth 132, a third bell tooth 136, a fourth bell tooth 140, and a spigot tooth 124. A wall extending between fourth tooth 140 and spigot tooth 124 has a concave curvature 125.

As will be apparent to one skilled in the art, various modifications can be made within the scope of the aforesaid description. For example, the plurality of bell teeth may include more or less than four teeth. Such modifications being within the ability of one skilled in the art form a part of the present invention and are embraced by the claims below.

It is claimed:

1. A method for inhibiting separation of a bell end from a spigot end of a pair of pipes, the bell end including a groove having a front wall, the method comprising:

positioning a gasket within the groove, the gasket including a rigid segment having (i) a spigot tooth with a spigot tooth vertices, the spigot tooth being configured for engaging the spigot end, (ii) a plurality of bell teeth configured for engaging the bell end, the plurality of bell teeth including a first tooth with a first tooth vertices, a second tooth with a second tooth vertices, a third tooth with a third tooth vertices, and a fourth tooth with a fourth tooth vertices, (iii) a first length defined between the spigot tooth vertices and the first tooth vertices, (iv) a second length defined between the spigot tooth vertices and the second tooth vertices, (v) a third length defined between the spigot tooth vertices and the third tooth vertices, and (vi) a fourth length defined between the spigot tooth vertices and the fourth tooth vertices, the second length being greater than the first length, the third length being greater than the second length and the fourth length being greater than the third length, inserting the spigot end into the bell end and through the gasket, partially withdrawing the spigot end from the bell end whereby the spigot tooth impinges upon the spigot end, the segment rotates in a first direction about the spigot tooth vertices and one or more of the plurality of bell teeth impinge upon the front wall, and partially reinserting the spigot end into the bell end whereby the segment rotates about the spigot tooth vertices in a second direction that is opposite to the first direction and at least one of the bell teeth of the plurality of bell teeth disengages from the front wall.

2. The method of claim 1, wherein a distance between the spigot tooth vertices and the front wall increases as the segment rotates in the first direction and decreases as the segment rotates in the second direction.

3. The method of claim 1, further comprising forming a first segment effective length defined between the spigot tooth vertices and the first tooth vertices, followed by forming a second segment effective length defined between the spigot tooth vertices and the second tooth vertices, followed by forming a third segment effective length defined between the spigot tooth vertices and the third tooth vertices, followed by forming a fourth segment length defined between the spigot tooth vertices and the fourth tooth vertices.

4. The method of claim 3, wherein each of the first segment effective length, the second segment effective length, the third segment effective length and the fourth segment effective length extends along a plane that intersects the spigot end to form an angle in the range of about 35° to 45°.

5. A method for inhibiting separation of a bell end from a spigot end of a pair of pipes, the bell end including a groove having a front wall, the method comprising:
positioning a gasket within the groove, the gasket including a rigid segment having (i) a spigot tooth with a spigot tooth vertices, the spigot tooth being configured for engaging the spigot end, (ii) a plurality of bell teeth configured for engaging the bell end, the plurality of bell teeth including a first tooth with a first tooth vertices, a second tooth with a second tooth vertices, a third tooth with a third tooth vertices, and a fourth tooth with a fourth tooth vertices, (iii) a first length defined between the spigot tooth vertices and the first tooth vertices, (iv) a second length defined between the spigot tooth vertices and the second tooth vertices, (v) a third length defined between the spigot tooth vertices and the third tooth vertices, and (vi) a fourth length defined between the spigot tooth vertices and the fourth tooth vertices, the second length being greater than the first length, the third length being greater than the second length and the fourth length being greater than the third length,
inserting the spigot end into the bell end and through the gasket, and
partially withdrawing the spigot end from the bell end whereby the spigot tooth impinges upon the spigot end, the segment rotates in a first direction about the spigot tooth vertices and one or more of the plurality of bell teeth impinge upon the front wall,
wherein partially withdrawing the spigot end from the bell end and rotating the segment in the first direction causes the first tooth to impinge upon the front wall, followed by the first tooth disengaging from the front wall.

6. The method of claim 5, further comprising partially reinserting the spigot end into the bell end whereby the segment rotates about the spigot tooth vertices in a second direction that is opposite to the first direction thereby causing the first tooth to impinge upon the front wall.

7. A method for inhibiting separation of a bell end from a spigot end of a pair of pipes, the bell end including a groove having a front wall, the method comprising:
positioning a gasket within the groove, the gasket including a rigid segment having (i) a spigot tooth with a spigot tooth vertices, the spigot tooth being configured for engaging the spigot end, (ii) a plurality of bell teeth configured for engaging the bell end, the plurality of bell teeth including a first tooth with a first tooth vertices, a second tooth with a second tooth vertices, a third tooth with a third tooth vertices, and a fourth tooth with a fourth tooth vertices, (iii) a first length defined between the spigot tooth vertices and the first tooth vertices, (iv) a second length defined between the spigot tooth vertices and the second tooth vertices, (v) a third length defined between the spigot tooth vertices and the third tooth vertices, and (vi) a fourth length defined between the spigot tooth vertices and the fourth tooth vertices, the second length being greater than the first length, the third length being greater than the second length and the fourth length being greater than the third length,
inserting the spigot end into the bell end and through the gasket,
partially withdrawing the spigot end from the bell end whereby the spigot tooth impinges upon the spigot end, the segment rotates in a first direction about the spigot tooth vertices and one or more of the plurality of bell teeth impinge upon the front wall, and
impinging the fourth tooth on the front wall while the first tooth and the second tooth are spaced apart from the front wall.

8. A method for inhibiting separation of a bell end from a spigot end of a pair of pipes, the bell end including a groove having a front wall, the method comprising:
positioning a gasket within the groove, the gasket including a rigid segment having (i) a spigot tooth with a spigot tooth vertices, the spigot tooth being configured for engaging the spigot end, (ii) a plurality of bell teeth configured for engaging the bell end, the plurality of bell teeth including a first tooth with a first tooth vertices, a second tooth with a second tooth vertices, a third tooth with a third tooth vertices, and a fourth tooth with a fourth tooth vertices, (iii) a first length defined between the spigot tooth vertices and the first tooth vertices, (iv) a second length defined between the spigot tooth vertices and the second tooth vertices, (v) a third length defined between the spigot tooth vertices and the third tooth vertices, and (vi) a fourth length defined between the spigot tooth vertices and the fourth tooth vertices, the second length being greater than the first length, the third length being greater than the second length and the fourth length being greater than the third length,
inserting the spigot end into the bell end and through the gasket,
partially withdrawing the spigot end from the bell end whereby the spigot tooth impinges upon the spigot end, the segment rotates in a first direction about the spigot tooth vertices and one or more of the plurality of bell teeth impinge upon the front wall, and
impinging the third tooth on the front wall while the first tooth is spaced apart from the front wall.

9. A method for inhibiting separation of a bell end from a spigot end of a pair of pipes, the bell end including a groove having a front wall, the method comprising:

positioning a gasket within the groove, the gasket including a rigid segment having (i) a spigot tooth with a spigot tooth vertices, the spigot tooth being configured for engaging the spigot end, (ii) a plurality of bell teeth configured for engaging the bell end, the plurality of bell teeth including a first tooth with a first tooth vertices, a second tooth with a second tooth vertices, a third tooth with a third tooth vertices, and a fourth tooth with a fourth tooth vertices, (iii) a first length defined between the spigot tooth vertices and the first tooth vertices, (iv) a second length defined between the spigot tooth vertices and the second tooth vertices, (v) a third length defined between the spigot tooth vertices and the third tooth vertices, and (vi) a fourth length defined between the spigot tooth vertices and the fourth tooth vertices, the second length being greater than the first length, the third length being greater than the second length and the fourth length being greater than the third length, inserting the spigot end into the bell end and through the gasket, partially withdrawing the spigot end from the bell end whereby the spigot tooth impinges upon the spigot end, the segment rotates in a first direction about the spigot tooth vertices and one or more of the plurality of bell teeth impinge upon the front wall, and impinging the first tooth and the second tooth on the front wall while the fourth tooth is spaced apart from the front wall.

10. A rigid gasket segment for inhibiting separation of a pair of joined pipes comprising:

a spigot tooth with a spigot tooth vertices, a plurality of bell teeth including a first tooth with a first tooth vertices, a second tooth with a second tooth vertices, a third tooth with a third tooth vertices, and a fourth tooth with a fourth tooth vertices, and a first length defined between the spigot tooth vertices and the first tooth vertices, a second length defined between the spigot tooth vertices and the second tooth vertices, a third length defined between the spigot tooth vertices and the third tooth vertices, and a fourth length defined between the spigot tooth vertices and the fourth tooth vertices, the second length being greater than the first length, the third length being greater than the second length and the fourth length being greater than the third length, wherein the first length extends along a first plane, the second length extends along a second plane, the third length extends along a third plane and the fourth length extends along a fourth plane, the first plane intersecting the second plane at angle of about 12°, the third plane intersecting the first plane at an angle of about 24° and the fourth plane intersecting the first plane at an angle of about 36°.

11. The segment of claim 10, wherein the spigot tooth includes a front face and a rear face that intersect at the spigot tooth vertices to form an angle of about 70°.

12. A rigid gasket segment for inhibiting separation of a pair of joined pipes comprising:

a spigot tooth with a spigot tooth vertices, a plurality of bell teeth including a first tooth with a first tooth vertices, a second tooth with a second tooth vertices, a third tooth with a third tooth vertices, and a fourth tooth with a fourth tooth vertices, and a first length defined between the spigot tooth vertices and the first tooth vertices, a second length defined between the spigot tooth vertices and the second tooth vertices, a third length defined between the spigot tooth vertices and the third tooth vertices, and a fourth length defined between the spigot tooth vertices and the fourth tooth vertices, the second length being greater than the first length, the third length being greater than the second length and the fourth length being greater than the third length, wherein each of the first tooth vertices, the second tooth vertices, the third tooth vertices and the fourth tooth vertices is formed by segment wall portions intersecting at an angle of about 60°.

13. A method for inhibiting separation of a bell end and a spigot end of a pair of pipes, the bell end including an annular groove having a front wall, the method comprising:

positioning a gasket within the groove, the gasket including a rigid segment having a spigot tooth and a plurality of bell teeth, the spigot tooth including a spigot tooth vertices, forming a pipe joint by inserting the spigot end into the bell end and through the gasket, pressurizing the pipe joint thereby causing the spigot end to partially withdraw from the bell end whereby the spigot tooth impinges upon the spigot end, the segment rotates in a first direction about the spigot tooth vertices and one or more of the plurality of bell teeth impinge upon the front wall, and decreasing pressure within the pipe joint thereby causing the spigot end to partially reinsert back into the bell end whereby the segment rotates about the spigot tooth vertices in a second direction that is opposite to the first direction and at least one of the bell teeth of the plurality of bell teeth disengages from the front wall.

14. The method of claim 13, wherein, when the plurality of bell teeth includes a first tooth, a second tooth, a third tooth and a fourth tooth, impinging the first tooth on the front wall, followed by impinging the second tooth on the front wall, followed by impinging the third tooth on the front wall, followed by impinging the fourth tooth on the front wall.

15. A method for inhibiting separation of a bell end and a spigot end of a pair of pipes, the bell end including an annular groove having a front wall, the method comprising:

positioning a gasket within the groove, the gasket including a rigid segment having a spigot tooth and a plurality of bell teeth, the spigot tooth including a spigot tooth vertices, forming a pipe joint by inserting the spigot end into the bell end and through the gasket, and pressurizing the pipe joint thereby causing the spigot end to partially withdraw from the bell end whereby the spigot tooth impinges upon the spigot end, the segment rotates in a first direction about the spigot tooth vertices and one or more of the plurality of bell teeth impinge upon the front wall, wherein partially withdrawing the spigot end from the bell end and rotating the segment in the first direction causes a first tooth of the plurality of bell teeth to impinge upon the front wall, followed by the first tooth disengaging from the front wall.

16. The method of claim 15, further comprising partially reinserting the spigot end into the bell end whereby the segment rotates about the spigot tooth vertices in a second direction that is opposite to the first direction thereby causing the first tooth to impinge upon the front wall.

17. The method of claim 15, wherein, when the plurality of bell teeth includes a first tooth, a second tooth, a third tooth and a fourth tooth, impinging the fourth tooth on the front wall while the first tooth and the second tooth are spaced apart from the front wall, impinging the third tooth on the front wall while the first tooth is spaced apart from the front wall and impinging the first tooth and the second tooth on the front wall while the fourth tooth is spaced apart from the front wall.

* * * * *